US007223816B2

(12) United States Patent
Handlin, Jr. et al.

(10) Patent No.: US 7,223,816 B2
(45) Date of Patent: May 29, 2007

(54) SOLVENT-FREE, HOT MELT ADHESIVE COMPOSITION COMPRISING A CONTROLLED DISTRIBUTION BLOCK COPOLYMER

(76) Inventors: Dale L. Handlin, Jr., 14211 Heartherhill Pl., Houston, TX (US) 77077; Carl L. Willis, 15922 Red Willow, Houston, TX (US) 77084; Caroline R. N. Maes, Avenue Jean Monnet 1, Ottignies, Louvain-la-Neuve B-1348 (FR)

( * ) Notice: Subject to any disclaimer, the term of this patent is extended or adjusted under 35 U.S.C. 154(b) by 0 days.

(21) Appl. No.: 10/511,992

(22) PCT Filed: Feb. 7, 2003

(86) PCT No.: PCT/NL03/00098

§ 371 (c)(1), (2), (4) Date: Oct. 21, 2004

(87) PCT Pub. No.: WO03/066769

PCT Pub. Date: Aug. 14, 2003

(65) Prior Publication Data

US 2005/0159547 A1 Jul. 21, 2005

(51) Int. Cl.
*C08F 297/04* (2006.01)

(52) U.S. Cl. .......................... 525/88; 525/89; 525/280; 525/258; 525/316; 525/92 D; 524/271

(58) Field of Classification Search ................. 525/88, 525/89, 280, 258, 316, 92 D, 289; 524/271
See application file for complete search history.

(56) References Cited

U.S. PATENT DOCUMENTS 2,975,160 A 3/1961 Zelinski
3,149,182 A 9/1964 Porter
RE27,145 E 6/1971 Jones
3,595,942 A 7/1971 Wald et al.
3,600,250 A 8/1971 Evans
3,634,549 A 1/1972 Shaw et al.
3,670,054 A 6/1972 De La Mare et al.
3,700,633 A 10/1972 Wald et al.
4,073,831 A 2/1978 Tabana et al.
4,089,913 A 5/1978 Miki et al.
4,107,131 A 8/1978 Gergen et al.
4,122,134 A 10/1978 Miki et al.
4,248,981 A 2/1981 Milkovich et al.
4,367,325 A 1/1983 Takeuchi et al.
4,412,087 A 10/1983 Trepka
4,547,560 A 10/1985 Hattori et al.
4,578,429 A 3/1986 Gergen et al.
4,603,155 A 7/1986 Muramori et al.
4,898,914 A 2/1990 Gergen et al.
4,970,265 A 11/1990 Willis
5,075,377 A 12/1991 Kawabuchi et al.
5,191,024 A 3/1993 Shibata et al.
5,206,300 A 4/1993 Chamberlain
5,276,101 A 1/1994 Chamberlain et al.
5,290,875 A 3/1994 Moczygemba et al.
5,306,779 A 4/1994 Shibata et al.
5,336,737 A 8/1994 van Ballegooijen et al.
5,346,964 A 9/1994 Shibata et al.
5,506,299 A 4/1996 Gelles et al.
5,516,831 A 5/1996 Pottick et al.
5,545,690 A 8/1996 Trepka et al.
5,603,155 A 2/1997 Satomi et al.
5,750,622 A * 5/1998 Himes ...................... 525/92 D
5,910,546 A 6/1999 Trepka et al.
5,972,519 A 10/1999 Niessner et al.
6,031,053 A 2/2000 Knoll et al.
6,107,411 A 8/2000 Toya et al.
6,197,889 B1 * 3/2001 Knoll et al. ................ 525/314
6,235,847 B1 5/2001 Hoshi et al.
6,265,484 B1 7/2001 Trepka et al.
6,265,485 B1 * 7/2001 Trepka et al. ................. 525/98
6,346,572 B1 2/2002 Loth et al.
6,521,712 B1 2/2003 Knoll et al.
6,759,454 B2 7/2004 Stephens et al.
6,987,142 B2 * 1/2006 St. Clair et al. ............ 524/505
2003/0153681 A1 8/2003 Handlin et al.
2003/0166776 A1 9/2003 Wright et al.
2003/0176582 A1 9/2003 Bening et al.
2003/0181584 A1 9/2003 Handlin et al.
2003/0181585 A1 9/2003 Handlin et al.

(Continued)

FOREIGN PATENT DOCUMENTS

EP 0 492 490 B1 8/1996

(Continued)

*Primary Examiner*—James J. Seidleck
*Assistant Examiner*—Olga Asinovsky
(74) *Attorney, Agent, or Firm*—Michael A. Masse; Novak, Druce & Quigg

(57) ABSTRACT

A novel solvent-free, hot melt adhesive composition suitable for bonding a polar leather layer to a non-polar substrate is claimed. The composition comprises a block copolymer having at least one mono alkenyl arene polymer block and at least one controlled distribution copolymer block of at least one conjugated diene and at least one mono alkenyl arene, a hydrogenated tackifying resin, a resin compatible with the mono alkenyl arene blocks, optionally a functionalized poly(alkylene) resin, and stabilizers and/or auxiliaries. A process for bonding a polar leather layer to a non-polar substrate by application of the novel solvent-free, hot melt adhesive composition is also provided.

10 Claims, No Drawings

U.S. PATENT DOCUMENTS

2005/0171290 A1 8/2005 Bening et al.

FOREIGN PATENT DOCUMENTS

| | | |
|---|---|---|
| EP | 0 796 871 A2 | 9/1997 |
| EP | 0 822 227 A1 | 2/1998 |
| EP | 0 877 038 A2 | 11/1998 |
| EP | 0 878 492 A1 | 11/1998 |
| EP | 0 879 836 A1 | 11/1998 |
| EP | 0 808 342 B1 | 12/1998 |
| EP | 0 654 488 B1 | 1/1999 |
| EP | 0 398 758 B1 | 3/1999 |
| EP | 0 859 803 B1 | 12/1999 |
| EP | 0 927 210 B1 | 6/2000 |
| EP | 0 766 706 B1 | 12/2001 |
| EP | 1 384 768 A1 | 1/2004 |
| GB | 2 138 009 A | 10/1984 |
| JP | 60-163910 | 8/1985 |
| JP | 61-291610 | 12/1986 |
| JP | 6-271717 | 9/1994 |
| JP | 7-149952 | 6/1995 |
| WO | 00/58380 | 10/2000 |

* cited by examiner

SOLVENT-FREE, HOT MELT ADHESIVE COMPOSITION COMPRISING A CONTROLLED DISTRIBUTION BLOCK COPOLYMER

FIELD OF THE INVENTION

The present invention relates to a solvent-free hot melt adhesive composition suitable for bonding a polar leather layer to a non-polar substrate, its use, a process of bonding a polar leather layer to the non-polar substrate using the solvent-free, hot melt composition and to composed leather articles wherein the polar leather and non-polar substrate are bonded by the solvent-free hot melt adhesive composition.

More particularly, the invention relates to a solvent-free, hot melt adhesive composition suitable for bonding footwear components and to footwear so obtained.

BACKGROUND OF THE INVENTION

Adhesive compositions for bonding footwear are known in the art. Such known compositions comprise significant amounts of organic solvents. Due to increasingly stringent regulations from health, safety, and environmental authorities said organic solvents have to be eliminated. Unfortunately, the number of alternative adhesive compositions, which are suitable for bonding highly non-polar footwear components, such as bonding synthetic polymeric shoe soles to polar components such as leather uppers, is limited. In addition, the conventional bonding technology requires a pre-treatment of the surface of the non-polar substrates in order to obtain an adequate bonding with a primer. This is essential when using highly non-polar synthetic footwear components, made from e.g. polyolefins or styrenic block copolymers, and particularly hydrogenated styrenic block copolymers, e.g. KRATON® G-2705 block copolymer compositions.

An improved solvent-free adhesive compositions for bonding a polar leather layer to a non-polar substrate layer was disclosed in co-pending application EP02016728.4, which shows a combination of excellent bonding properties and more reliable applicability and processability and lower operational costs, e.g. by operating at lower processing temperatures or in an one step process, enabling shorter cycle times. The polymers described therein are grafted with maleic anhydride. These compositions have relative high HM (high-molecular) viscosity and need high application temperatures of about 230 to 260° C.

Now a novel anionic block copolymer based on mono alkenyl arene end blocks and controlled distribution mid blocks of mono alkenyl arenes and conjugated dienes has been discovered and is described in copending, commonly assigned U.S. patent application Ser. No. 60/355,210, entitled "NOVEL BLOCK COPOLYMERS AND METHOD FOR MAKING SAME". Methods for making such polymers are described in detail in the above-mentioned patent application.

There is need to a solvent-free, hot melt adhesive composition suitable for bonding a polar leather layer to a non-polar substrate that possesses lower HM viscosity and needs application temperatures below 230° C. At the same time the required good bonding between the components must be maintained for a sufficient long time, i.e. sufficiently lifetime of the produced shoes, leather suitcases, composed leather sporting articles such as golf bags and horse saddles, fashion articles (belts, handbags, briefcases). An object of the present invention is therefore to provide said solvent-free adhesive composition. Another object of the present invention is to provide a process for the manufacturing of composed products, comprising a polar leather component bonded to a non-polar synthetic or polymeric substrate component, and use of said solvent-free adhesive composition.

These and other objects were obtained by providing a new solvent-free hot melt adhesive composition.

SUMMARY OF THE INVENTION

Accordingly the invention relates to a solvent-free, hot melt adhesive composition suitable for bonding a polar leather layer to a non-polar substrate, comprising:

(a) a block copolymer having at least one A block and at least one B block, wherein:
  - (i) each A block independently is a mono alkenyl arene polymer block and each B block independently is a controlled distribution copolymer block of at least one conjugated diene and at least one mono alkenyl arene;
  - (ii) each A block having an average molecular weight between about 3,000 and about 60,000 and each B block having an average molecular weight between about 30,000 and about 300,000;
  - (iii) each B block comprises terminal regions adjacent to the A block that are rich in conjugated diene units and one or more regions not adjacent to the A blocks that are rich in mono alkenyl arene units;
  - (iv) the total amount of mono alkenyl arene in the block copolymer is about 20 percent weight to about 80 percent weight; and
  - (v) the weight percent of mono alkenyl arene in each B block is between about 10 percent and about 75 percent;

(b) a hydrogenated hydrocarbon tackifying resin, with a softening point lower than 140° C., preferably lower than 100° C. and more preferably lower than 90° C., in a weight proportion of 30 to 150 parts by weight of tackifying resin per 100 parts per weight of block copolymer and preferably from 50 to 120 parts by weight per 100 parts by weight of block copolymer;

(c) a resin which is compatible with the mono alkenyl arene blocks, having a softening point lower than 140° C. and preferably lower than 110° C., in a weight proportion of from 10 to 80 parts by weight and preferably from 20 to 60 parts by weight of resin per 100 parts by weight of block copolymer;

(d) optionally a melt flow improving poly(alkylene) resin, which is functionalized, in a weight proportion of from 0 to 30 parts by weight, and preferably from 5 to 20 parts by weight per 100 parts by weight of block copolymer, and (e) stabilizers and/or additional auxiliaries in a weight proportion of from 0.1 to 1 part by weight per 100 parts by weight of block copolymer.

DETAILED DESCRIPTION OF THE INVENTION

Examples of non-polar substrates are compositions, particularly for shoe soles (or midsoles), comprising inter alia: vinylarene/conjugated diene block copolymers such as KRATON® D copolymers, hydrogenated vinylarene/conjugated diene block copolymers such as KRATON® G copolymers, vinylarene/ conjugated diene random copolymers, natural rubbers, poly(vinylarene), polyolefin, EVA copolymer, and/or mixtures thereof, optionally in admixture with oils and other auxiliaries.

The present invention makes use of novel compositions. The combination of (1) a unique control for the monomer addition and (2) the use of diethyl ether or other modifiers as a component of the solvent (which will be referred to as "distribution agents") results in a certain characteristic distribution of the two monomers (herein termed a "controlled distribution" polymerization, i.e., a polymerization resulting in a "controlled distribution" structure), and also results in the presence of certain mono alkenyl arene rich regions and certain conjugated diene rich regions in the polymer block. For purposes hereof, "controlled distribution" is defined as referring to a molecular structure having the following attributes: (1) terminal regions adjacent to the mono alkenyl arene homopolymer ("A") blocks that are rich in (i.e., have a greater than average amount of) conjugated diene units; (2) one or more regions not adjacent to the A blocks that are rich in (i.e., have a greater than average amount of) mono alkenyl arene units; and (3) an overall structure having relatively low blockiness. For the purposes hereof, "rich in" is defined as greater than the average amount, preferably greater than 5% the average amount. The relatively low blockiness can be shown by either the presence of only a single glass transition temperature ("Tg,") for the controlled distribution polymer block intermediate between the Tg's of either monomer alone, when analyzed using differential scanning calorimetry ("DSC") thermal methods or via mechanical methods, or as shown via proton nuclear magnetic resonance (1H-NMR) methods. The potential for blockiness can also be inferred from measurement of the UV-visible absorbance in a wavelength range suitable for the detection of polystyryl lithium end groups during the polymerization of the B block. A sharp and substantial increase in this value is indicative of a substantial increase in polystyryl lithium chain ends. In this process, this will only occur if the conjugated diene concentration drops below the critical level to maintain controlled distribution polymerization. Any styrene monomer that is present at this point will add in a blocky fashion. The term "styrene blockiness", as measured by those skilled in the art, using proton NMR, is defined to be the proportion of S units in the polymer having two S nearest neighbors on the polymer chain. The styrene blockiness is determined after using 1H-NMR to measure two experimental quantities as follows:

First, the total number of styrene units (i.e. arbitrary instrument units which cancel out when ratioed) is determined by integrating the total styrene aromatic signal in the 1H-NMR spectrum from 7.5 to 6.2 ppm and dividing this quantity by 5 to account for the 5 aromatic hydrogens on each styrene aromatic ring.

Second, the blocky styrene units are determined by integrating that portion of the aromatic signal in the 1H-NMR spectrum from the signal minimum between 6.88 and 6.80 to 6.2 ppm and dividing this quantity by 2 to account for the 2 ortho-hydrogens on each blocky styrene aromatic ring. The styrene blockiness is the percentage of blocky styrene to total styrene units:

Blocky %=100 times (Blocky Styrene Units/Total Styrene Units)

Expressed thus, Polymer-Bd-S-(S)n-S-Bd-Polymer, where n is greater than zero is defined to be blocky styrene. It is preferred that the blockiness index be less than about 40. For some polymers, having styrene contents of ten weight percent to forty weight percent, it is preferred that the blockiness index be less than about 10.

In a preferred embodiment of the present invention, the subject controlled distribution copolymer block has three distinct regions—conjugated diene rich regions on the end of the block and a mono alkenyl arene rich region near the middle or center of the block (mid-block). Preferred copolymers have the general configuration A-B, A-B-A, (A-B)n, (A-B)n-A, (A-B-A)nX, or (A-B)nX, wherein n is an integer from 2 to 30, preferably from 2 to 6, X is coupling agent residue and wherein A and B have the meaning defined hereinbefore. Best results are obtained with copolymers wherein at least one of A and B are hydrogenated. Preferably, the copolymers have a mid-block with 15 to 35% alkenyl arene, particularly styrene. More preferred these copolymers have a mid-block with 20–30% styrene.

In a preferred embodiment the solvent-free, hot melt adhesive composition further comprises at least one C block, wherein each C block is a polymer block of one or more conjugated dienes, having an average number molecular weight between 2,000 and 200,000.

To the adhesive composition an acid compound or its derivative may be grafted and/or it may be reacted with a silicon or boron-containing compound, with at least one ethylene oxide molecule, with at least one carbon dioxide molecule and/or which has been metallated with an alkali metal alkyl.

Preferably, the A block has a glass transition temperature of +80° C. to +110° C. and the B block has a glass transition temperature of above −60° C. to less than the glass transition temperature of the A block, preferably between −40° C. and +30° C.

The Young's modulus preferably is below 25% elongation of less than 2,800 psi (20 MPa) and the rubber modulus or slope is between 100 and 300% elongation of greater than 70 psi (0.5 MPa).

Preferably, at least one of the components of the block copolymer is at least partially hydrogenated, more preferably less than 10% of the arene double bonds are reduced and at least 90% of the conjugated diene double bonds are reduced.

Anionic, solution copolymerization to form the controlled distribution copolymers of the present invention can be carried out using, to a great extent, known and previously employed methods and materials. In general, the copolymerization is attained anionically, using known selections of adjunct materials, including polymerization initiators, solvents, promoters, and structure modifiers, but as a key feature of the present invention, in the presence of a certain distribution agent. Such distribution agent is, in preferred embodiments, a non-chelating ether. Examples of such ether compounds are cyclic ethers such as tetrahydrofuran and tetrahydropyrane and aliphatic monoethers such as diethyl ether and dibutyl ether. Other distribution agents include, for example, ortho-dimethoxybenzene or "ODMB", which is sometimes referred to as a chelating agent.

An important aspect of the present invention is to control the microstructure or vinyl content of the conjugated diene in the controlled distribution copolymer block. The term "vinyl content" refers to the fact that a conjugated diene is polymerized via 1,2-addition (in the case of butadiene—it would be 3,4-addition in the case of isoprene). Although a pure "vinyl" group is formed only in the case of 1,2-addition polymerization of 1,3-butadiene, the effects of 3,4-addition polymerization of isoprene (and similar addition for other conjugated dienes) on the final properties of the block copolymer will be similar. The term "vinyl" refers to the presence of a pendant vinyl group on the polymer chain. When referring to the use of butadiene as the conjugated diene, it is preferred that about 20 to about 80 mol percent of the condensed butadiene units in the copolymer block have 1,2 vinyl configuration as determined by proton NMR analysis. For selectively hydrogenated block copolymers, preferably about 30 to about 70 mol percent of the condensed butadiene units should have 1,2 configuration. For unsaturated block copolymers, preferably about 20 to about 40 mol percent of the condensed butadiene units should have 1,2-vinyl configuration. This is effectively controlled by varying the relative amount of the distribution agent.

The solvent used as the polymerization vehicle may be any hydrocarbon that does not react with the living anionic chain end of the forming polymer, is easily handled in commercial polymerization units, and offers the appropriate solubility characteristics for the product polymer. For example, non-polar aliphatic hydrocarbons, which are generally lacking in ionizable hydrogens make particularly suitable solvents. Frequently used are cyclic alkanes, such as cyclopentane, cyclohexane, cycloheptane, and cyclooctane.

Starting materials for preparing the novel controlled distribution copolymers of the present invention include the initial monomers. The alkenyl arene can be selected from styrene, alpha-methylstyrene, para-methylstyrene, vinyl toluene, vinylnaphthalene, and para-butyl styrene or mixtures thereof. Of these, styrene is most preferred and is commercially available, and relatively inexpensive, from a variety of manufacturers. The conjugated dienes for use herein are 1,3-butadiene and substituted butadienes such as isoprene, piperylene, 2,3-dimethyl-1,3-butadiene, and 1-phenyl-1,3-butadiene, or mixtures thereof. Of these, 1,3-butadiene is most preferred. As used herein "butadiene" refers specifically to "1,3-butadiene".

Other important starting materials for anionic copolymerizations include one or more polymerization initiators. In the present invention such include, for example, alkyl lithium compounds and other organo lithium compounds such as s-butyl lithium, n-butyl lithium, t-butyl lithium, amyl lithium and the like, including di-initiators such as the di-sec-butyl lithium adduct of m-diisopropenyl benzene. Of the various polymerization initiators, s-butyl lithium is preferred.

Polymerization conditions to prepare the novel copolymers of the present invention are typically similar to those used for anionic polymerizations in general. In the present invention polymerization is preferably carried out at a temperature of from −30 to +150° C., more preferably +10 to +100° C., and most preferably, in view of industrial limitations, 30 to 90° C. It is carried out in an inert atmosphere preferably nitrogen, and may also be accomplished under pressure within the range of from about 0.5 to about 10 bars. This copolymerization generally requires less than about 12 hours, and can be accomplished in from about 5 minutes to about 5 hours, depending upon the temperature, the concentration of the monomer components, the molecular weight of the polymer and the amount of distribution agent that is employed.

The component (b) is actually blended with the block copolymer component (a) to provide tack. Examples of hydrogenated hydrocarbon tackifying resins which may be suitable applied in the adhesive compositions of the present invention are hydrogenated rosin esters, and more in particular the glycerol ester of hydrogenated rosin or pentaerythritol ester of hydrogenated rosin (e.g. FORAL™ 85E, FORALYNE™ 85E, or FORAL™ 105) or hydrogenated hydrocarbon resins (e.g., such as REGALITE™ R resins or ARKON M resins or ESCOREZ™ 5000 series or STABILITE™ resins). Preferably, diglycerol ester of highly hydrogenated resin (FORAL™ 85-E) is used as component (b) and more preferably in an amount of from 70 to 100 PHR.

As resin, which is compatible with resinous terminal block portions of the block copolymer (component c), an aromatic hydrocarbon resin can be used. Useful resins include coumarone-indene resins, poly(alpha-methyl styrene) resins, poly styrene resins or vinyl toluene-(alpha-methyl styrene) copolymers. Examples of aromatic hydrocarbon resins useful in the adhesive composition of the present invention are AMOCO 18 series resins, KRISTALEX™ series resins (e.g. KRISTALEX™ F100 or 3115), which are composed of alpha-methyl styrene (EASTMAN), PICCOTEX™ series resins which are composed of alpha-methyl styrene and vinyl toluene (EASTMAN), NEVCHEM™ (NEVILLE) and PICCO™ 6000 (EASTMAN) series resins which are composed of aromatic hydrocarbons, CUMAR™ series resins, e.g. CUMAR™ LX509 (NEVILLE) which are composed of coumarone-indene resins, HERCURES™ A101 resin (aromatic resin derived from aromatic petroleum (EASTMAN). As preferred resin component (c) HERCURES™ A101 resin or KRISTALEX™ F100 resin are used.

As optional component (d) can be used homopolymers of propylene or one or more crystalline copolymers of propylene, which contain 50 wt % or more propylene (e.g. ADFLEX™ copolymers, i.e. copolymers made of propylene and a further olefin by the CATALLOY™ process), or mixtures of the hereinbefore mentioned (co)polymers, which have been acid grafted and preferably with maleic acid or maleic anhydride. In preferred solvent-free, hot melt adhesive compositions said propylene (co)polymer is included more preferably in amounts of 5 to 20 parts by weight per 100 parts by weight of block copolymer. Preferred propylene copolymers are PP QESTRON™ KA 802A, PP QESTRON™ 805A, which are maleic anhydride grafted heterophasic PP copolymers of BASELL.

As component (e) can be used stabilizers, which are known from e.g. U.S. Pat. No. 4,835,200. More in particular phenolic antioxidant (IRGANOX™), benzotriazole ultraviolet inhibitor (TINUVIN™ P) and a hindered amine ultraviolet inhibitor (TINUVIN™ 770) can be used to stabilize the formulation against degradation. Particularly preferred are hindered phenols and more preferred less volatile hindered phenols such as tetrakis[methylene-3,5-di-tert-butyl-4-hydroxy-hydrocinnamate]methane (IRGANOX™ 1010 antioxidant) or 2(3,5-di-tert-butyl-4-hydroxy)-4,6-bis (N-octylthio)-1,3,3-triazine (IRGANOX™ 565 antioxidant). TINUVIN™ P and IRGANOX™ 1010 are known to show synergistic effect in polymer stabilization.

It will be appreciated that the solvent-free, hot melt adhesive composition provides excellent bonding when applied at 150 to 230° C. Preferably, the bonding is provided when applying a temperature between 170 and 200° C. Moreover the bonded polar leather—non-polar synthetic material composites do not show any break upon repeatedly bending contrary to the composites made by using prior hot melt adhesive compositions. Therefore the adhesive compositions of the present invention have been found to provide attractive flexing endurance or resistance to flexing to footwear.

It will be appreciated that another aspect of the present invention is formed by the use of hereinbefore specified solvent-free, hot melt adhesive compositions for bonding a polar leather layer to a non-polar substrate. In particular said use relates to the bonding of shoe components and components of other formed leather articles such as suitcases, sporting articles and fashion articles, formed from a leather component and a synthetic polymeric non-polar component. More in particular said use relates to the bonding of shoe uppers and soles. In a more preferred use the shoe uppers are made of leather and the shoe soles are made of a non-polar polymeric material.

Moreover, the present invention is also relating to a process for bonding a polar leather layer to a non-polar synthetic polymeric layer, and more preferably shoe components, by the use of the hereinbefore-specified adhesive compositions of the invention. Such process may, and preferably is automated.

It will be appreciated that another aspect of the present invention is formed by the composed formed articles, such as shoes, handbags suitcases, derived from a polar leather component and a non-polar synthetic component, which have been bonded to each other with a hereinbefore defined adhesive composition.

The invention is further illustrated by the following examples, however without restricting its scope to these specific embodiments.

EXAMPLE 1

Various controlled distribution copolymers of the present invention were prepared according to the process claimed herein. All polymers were selectively hydrogenated ABA block copolymers where the A blocks were polystyrene blocks and the B block prior to hydrogenation was a styrene/butadiene controlled distribution block copolymer having terminal regions that are rich in butadiene units and a center region that was rich in styrene units. The polymers were hydrogenated under standard conditions such that greater than 95% of the diene double bonds in the B block have been reduced.

The following describes the general procedure used to effectively control the distribution of the comonomers in the anionic copolymerization of 1,3-butadiene (Bd) and styrene (S) in the presence of diethyl ether (DEE). A number of tri-block copolymers were synthesized stepwise in cyclohexane. DEE was used to control the distribution of copolymerization of styrene and butadiene in the rubber mid-block. During the copolymerization step, a number of samples were collected as the reaction progressed to enable 1H-NMR characterization of the degree of comonomer distribution.

For Step I, an appropriate amount of polymerization grade cyclohexane was charged to a well-mixed 227 liter stainless steel reactor vessel at 30° C. Pressure in the reactor vessel was controlled with nitrogen gas. Styrene monomer was charged to the reactor at 30° C. 10 ml increments of sec-butyl lithium (12 wt. %) were added to the reactor to titrate the cyclohexane and styrene monomer mixture. The titration endpoint was determined with an on-line calorimeter. After titration, sec-butyl lithium was then added to the reactor to initiate the anionic polymerization of the living polystyrene blocks. The temperature was allowed to increase to 55° C. and the reaction was carried out to 99.9% conversion of the styrene. This completed the first styrene block of this block copolymer, (S)-.

For Step II, an appropriate amount of polymerization grade cyclohexane was charged to a well-mixed 492 liter stainless steel reactor vessel at 30° C. First, all of the styrene monomer required in the Step II reaction was charged to the reactor. Second, one-half of the butadiene monomer required in the Step II reaction was charged to the reactor. Third, an appropriate amount of diethyl ether was charged to the reactor. Fourth, 10 ml increments of sec-butyllithium (12% wt.) were added to the reactor to titrate the cyclohexane, styrene monomer, butadiene monomer and diethyl ether mixture. The titration endpoint was determined with an on-line calorimeter. After titration of the Step II recatonts, the living polystyrene chains were transferred via nitrogen pressure from the Step I reactor vessel to the Step II reactor vessel to initiate the Step II copolymerization reaction of styrene and butadiene at 30° C. Ten minutes after the initiation of the copolymerization, the remaining one-half of the butadiene monomer was dosed to the Step II reactor at a rate that kept the overall polymerization rate nearly constant. The temperature was allowed to increase to 55° C. and the reaction was carried out to 99.9% conversion basis butadiene kinetics. This completed the addition of a styrene-butadiene randomized mid-block to the Step I polystyrene block. The polymer structure at this point is (S)-(S/Bd)-.

For Step III, more styrene monomer was charged to the Step II reactor vessel at 55° C. to react with the living (S)-(S/Bd)-polymer chains. The Step III reaction was maintained at near isothermal conditions until 99.9% conversion of the styrene. The living polymer chains were terminated by adding an appropriate amount (about 10% molar excess) of high-grade methanol to the final reactor solution. The final polymer structure was (S)-(S/Bd)-(S). All polymers were then selectively hydrogenated to produce linear ABA block copolymers where the A blocks were polystyrene blocks and the B block prior to hydrogenation was a styrene butadiene controlled distribution block having terminal regions that are rich in butadiene units and a center region that was rich in styrene units. The various polymers are shown in Table 1 below. Step I MW is the molecular weight of the first A block, Step II MW is the molecular weight of the AB blocks and Step III MW is the molecular weight of the ABA blocks. The polymers were hydrogenated such that greater than about 95% of the diene double bonds have been reduced.

This type of experiment was executed several times over a range of varying styrene-butadiene mid-block compositions. The following describes the method used to characterize the polymer mid or “B” block. It is the nature of the polymerization that the polymer mid-block is formed after an initial styrene block. Since the polymer mid-block which is formed in Step II cannot be analyzed in isolation, it must be analyzed in combination with the Step I styrene block, and the contribution of the Step I styrene block must be subtracted from the sum to determine the parameters which characterize the polymer mid-block. Four experimental quantities are used to calculate the percent styrene content in the polymer mid-block (Mid PSC) and the percent blocky styrene in the polymer mid-block (Mid Blocky). (Note: % BD12 for the mid-block is measured directly with no need to correct a BD contribution from the Step I styrene block).

The total styrene mass in Step II is given by:

$$33.4\text{ wt \% of }86.8\text{ k}=29.0\text{ k styrene in Step II}$$

The styrene mass of the mid-block is found by subtracting the Step I styrene mass from the styrene in Step II:

$$29.0k-9.0k=20.0k\text{ styrene in mid-block}$$

The mass of the mid-block is given by subtracting the Step I MW from the Step II MW:

$$86.8k-9.0k=77.8k\text{ mass if mid-block}$$

The “Mid PSC” is the percent of mid-block styrene relative to the mid-block mass:

$$100*20.0k\text{ mid-block styrene}/77.8k\text{ mid-block mass}=25.7\text{ wt \%}$$

The blocky styrene % and the Step II styrene mass gives the mass of blocky styrene:

33% of 29.0k=9.6k Step II blocky styrene

The Step I styrene block is subtracted from the mass of Step II blocky styrene to give the mass of blocky styrene in the mid-block:

9.6*k* Step II blocky styrene−9.0*k* Step I styrene block=0.6*k*

The "Mid Blocky" is the percent of blocky styrene in the mid-block relative to the styrene in the mid-block:

100*0.6*k* mid-block blocky styrene/20.0*k* mid-block styrene=3%

TABLE 1

Controlled Distribution Polymers

| Polymer Number | Step I MW (k) | Step II MW (k) | Step III MW (k) | % Styrene in Step II | Styrene Blockiness | 1,2-BD (%) | PSC (%) |
|---|---|---|---|---|---|---|---|
| 25 | 9.1 | 89 | 97 | 25 | 0 | 36 | 39 |
| 27 | 7.5 | 70 | 77 | 25 | 3 | 36.1 | 40 |
| 28 | 7.8 | 39 | — | 25 | 16 | 36 | 39 |
| 26 | 7.3 | 43 | 50 | 37 | 0 | 36.7 | 47 |

where
"MW (k)" = molecular weight in thousands and
"PSC (%)" = wt % of styrene in the final polymer.
"Styrene Blockiness" is for just the B block.

EXAMPLE 2

Hypothetical Preparation of a Hot Melt Adhesive

A typical solvent-free, hot melt adhesive composition according to the present invention comprises 125 parts by weight of the CD polymer, 100 parts by weight of a tackifying resin (e.g., Foralyne 85E), 50 parts by weight of of a resin (e.g., Hercules A101) and 3 parts by weight of an antioxidant (e.g., Irganox 1010). Typical compositions may further comprise polypropylene.

The solvent-free, hot melt adhesive composition may be prepared using a MARIS™ 30VI, 30 mm corotating twin screw extruder. The gravimetric feeders thereof, one for the polymer and two for the resin, can be equipped with a vibration tray. The processing of hot melts begins with pre-blending the polymer, the polypropylene if any and antioxidant. The pre-blend may then be added to the extruder via the first feeding port. At the second and third feeding port, part of the resins (⅓ to ½ of the total amount of resin) may be added.

The hot melt strand may be cut on a GALA™ granulator with a die plate temperature of 130° C. and at a speed of 1500 rpm and cooled by water.

A hot melt adhesive composition prepared in line with the instructions above may be tested in line with common practice as applied by shoe producers. For instance, the sole/upper bonding may be tested by means of ROSSFLEX test bars (75×25×7 mm), which can be injection molded on a 200 kW BATTENFELD™ BA 200/50 CD molding machine and subsequently cut in two parts for use in the assembling lab test. Pre-buffed leather straps of similar dimension can be used.

A hot melt dispenser, equipped with a 2 mm thick slit die (10 mm wide), may be used to manually apply a hot melt layer onto non-primed compound test bars. Suitable hot melt application temperatures vary from 260° to 200° C. The adhesive application and bonding operation (including the positioning of the test bar onto the leather strap and time till applying full pressure) should be kept as short as possible to prevent the hot melt from cooling down and as such keep the hot melt viscosity as low as possible.

After hot melt application, the test bars and leather straps may be immediately pressed for 15 seconds at 12 kg/cm$^2$. In order to fix the bonds well, it may be necessary to apply pressure on the test assembly until the bond has built up sufficient strength to avoid separation upon removal from the press.

T-peel testing may be carried out according to the SATRA AM1 180° C. T-peel test after storing the samples to be tested for at least 24 hours in a standard controlled environment at 21° C. and 65% relative humidity. The Peel tests may be carried out using the ZWICK™ tensile tester and at a rate of 100 mm/sec until a bond length of 30 mm had been peeled.

EXAMPLE 3

Illustrative Example

A scouting experiment was conducted with CD polymer #25, in line with the instructions of Example 2. The hot melt adhesive was compared with the adhesive of co-pending application EP02016728.4, albeit that the block copolymer of the comparative composition has a lower molecular weight and has been grafted with maleic anhydride.

Adhesion values were found for the composition according to the invention that exceed the industry requirement of 5 N/mm and that are slightly higher than those obtained using the comparative composition (6.8 N/mm vs. 4.3 N/mm when applied on a standard non-primed sole substrate at 230° C.). Further improvements in respect of melt viscosity may be had by using a DC polymer having a lower molecular weight.

The invention claimed is:

1. A hot melt adhesive suitable for bonding a polar leather layer to a non-polar substrate, comprising:

(a) a block copolymer having at least one A block and at least one B block, wherein:

(i) each A block is a mono alkenyl arene polymer block and each B block is a controlled distribution copolymer block of at least one conjugated diene and at least one mono alkenyl arene;

(ii) each A block having an average molecular weight between about 3,000 and about 60,000 and each B block having an average molecular weight between about 30,000 and about 300,000;

(iii) each B block comprises terminal regions adjacent to the A block that are rich in conjugated diene units and one or more regions not adjacent to the A blocks that are rich in mono alkenyl arene units;

(iv) the total amount of mono alkenyl arene in the block copolymer is about 20 percent weight to about 80 percent weight;

(v) the weight percent of mono alkenyl arene in each B block is between about 10 percent and about 75 percent;

(vi) the styrene blockiness index of the block B is less than 40 percent, said styrene blockiness index being the proportion of styrene units in the block B having two styrene neighbors on the polymer chain; and wherein the block copolymer has a Young's modulus below 25% elongation of less than 20 MPa and a rubber modulus or slope between 100 and 300% elongation of greater than 0.5 MPa;

(b) a hydrogenated hydrocarbon tackifying resin, with a softening point lower than 140° C. in a weight proportion of 30 to 150 parts by weight of tackifying resin per 100 parts per weight of block copolymer;

(c) a resin which is compatible with the mono alkenyl arene blocks, having a softening point lower than 140° C., in a weight proportion of from 10 to 80 parts by weight of resin per 100 parts by weight of block copolymer;

(d) optionally a melt flow improving poly(alkylene) resin, which is functionalized, in a weight proportion of from 0 to 30 parts by weight per 100 parts by weight of block copolymer, and (e) stabilizers and/or additional auxiliaries in a weight proportion of from 0.1 to 1 part by weight per 100 parts by weight of block copolymer.

2. The hot melt adhesive of claim 1 wherein in the block copolymer mono alkenyl arene is styrene and the conjugated diene is isoprene, butadiene, or a mixture thereof.

3. The hot melt adhesive of claim 1 wherein in the block copolymer the conjugated diene is butadiene and wherein 20 to 80 mol percent of the condensed butadiene units in block B have 1,2-configuration.

4. The hot melt adhesive of claim 1 wherein the block copolymer has the general configuration A-B, A-B-A, (A-B)n, (A-B)n-A, (A-B-A)nX, or (A-B)nX, wherein n is an integer from 2 to 30, X is coupling agent residue and wherein A and B have the meaning defined hereinbefore.

5. The hot melt adhesive of claim 1 wherein component (b) comprises hydrogenated rosin esters or hydrogenated hydrocarbon resin, and is present in a weight proportion of from 50 to 120 parts by weight resin per 100 parts by weight of block copolymer.

6. The hot melt adhesive of claim 1 wherein component (c) comprises an aromatic hydrocarbon resin.

7. The hot melt adhesive of claim 6 wherein component (c) comprises at least one of coumarone-indene resins, poly(alpha-methyl-styrene) resins, poly styrene resins, and vinyl toluene-(alpha-methyl-styrene) copolymers.

8. The hot melt adhesive of claim 1 wherein the styrene blockiness index of the block B is less than 10 percent.

9. The hot melt adhesive of claim 1, wherein the hydrogenated hydrocarbon tackifying resin has a softening point of lower than 100° C. and is in a weight proportion of from 50 to 120 parts by weight of tackifying resin per 100 parts by weight of block copolymer.

10. The hot melt adhesive of claim 1, wherein the resin which is compatible with the mono alkenyl arene blocks has a softening point lower than 110° C., and is in a weight proportion of from 20 to 60 parts by weight of resin per 100 parts by weight of block copolymer.

* * * * *